(12) United States Patent
Chun et al.

(10) Patent No.: US 7,965,740 B2
(45) Date of Patent: Jun. 21, 2011

(54) METHOD OF TRANSMITTING DATA IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/451,219

(22) PCT Filed: May 1, 2008

(86) PCT No.: PCT/KR2008/002484
§ 371 (c)(1),
(2), (4) Date: Apr. 29, 2010

(87) PCT Pub. No.: WO2008/136600
PCT Pub. Date: Nov. 13, 2008

(65) Prior Publication Data
US 2010/0202476 A1    Aug. 12, 2010

Related U.S. Application Data

(60) Provisional application No. 60/915,666, filed on May 2, 2007, provisional application No. 60/915,917, filed on May 3, 2007.

(30) Foreign Application Priority Data

Apr. 30, 2008    (KR) .................... 10-2008-0040614

(51) Int. Cl.
*H04J 3/24*    (2006.01)

(52) U.S. Cl. .................. 370/474; 370/521; 709/247
(58) Field of Classification Search .................. 370/395, 370/389, 352, 474–479, 521–536; 709/247
See application file for complete search history.

(56) References Cited

U.S. PATENT DOCUMENTS

| 6,157,833 A | 12/2000 | Lawson-Jenkins |
| 6,324,171 B1 | 11/2001 | Lee et al. |
| 6,353,628 B1 | 3/2002 | Wallace et al. |

(Continued)

FOREIGN PATENT DOCUMENTS

EP    1 148 753    10/2001

(Continued)

OTHER PUBLICATIONS

Sammour et al., U.S. Appl. No. 60/863,185.

(Continued)

*Primary Examiner* — Ricky Ngo
*Assistant Examiner* — Iqbal Zaidi
(74) *Attorney, Agent, or Firm* — McKenna Long & Aldridge LLP (57) ABSTRACT

A method of generating a data block to be transmitted from a protocol layer to a receiving side in a wireless communication system, the protocol layer having a header compression function, comprises generating at least one of a control packet which includes control information and a compressed packet generated by header compression for an upper layer data block, and generating a first lower layer data block which includes type indication information and the control packet, if the control packet is generated, the type indication information indicating a type of control information included in the generated control packet.

13 Claims, 9 Drawing Sheets

U.S. PATENT DOCUMENTS

| | | | |
|---|---|---|---|
| 6,526,027 B1 | 2/2003 | Yeom et al. | |
| 6,567,409 B1 | 5/2003 | Tozaki et al. | |
| 6,725,267 B1 | 4/2004 | Hoang | |
| 7,197,317 B2 | 3/2007 | Parkvall et al. | |
| 7,245,707 B1 | 7/2007 | Chan | |
| 7,551,643 B2* | 6/2009 | Yeo et al. | 370/469 |
| 2001/0017850 A1 | 8/2001 | Kalliokulju et al. | |
| 2001/0044322 A1 | 11/2001 | Raaf | |
| 2002/0024972 A1 | 2/2002 | Yi et al. | |
| 2002/0028690 A1 | 3/2002 | McKenna et al. | |
| 2002/0057663 A1 | 5/2002 | Lim | |
| 2003/0007512 A1 | 1/2003 | Tourunen et al. | |
| 2003/0123485 A1* | 7/2003 | Yi et al. | 370/477 |
| 2003/0165133 A1 | 9/2003 | Garani | |
| 2003/0189922 A1* | 10/2003 | Howe | 370/352 |
| 2003/0207696 A1 | 11/2003 | Willenegger et al. | |
| 2004/0014452 A1 | 1/2004 | Lim et al. | |
| 2004/0028078 A1 | 2/2004 | Beckmann et al. | |
| 2004/0117860 A1 | 6/2004 | Yi et al. | |
| 2004/0121771 A1 | 6/2004 | Song et al. | |
| 2004/0253959 A1 | 12/2004 | Hwang et al. | |
| 2005/0041610 A1 | 2/2005 | Lee et al. | |
| 2005/0041681 A1 | 2/2005 | Lee et al. | |
| 2005/0085254 A1 | 4/2005 | Chuah et al. | |
| 2005/0094670 A1 | 5/2005 | Kim | |
| 2005/0141462 A1 | 6/2005 | Aerraboutu et al. | |
| 2005/0176474 A1 | 8/2005 | Lee et al. | |
| 2005/0185620 A1 | 8/2005 | Lee et al. | |
| 2005/0238051 A1 | 10/2005 | Yi et al. | |
| 2006/0067364 A1 | 3/2006 | Jung et al. | |
| 2006/0087994 A1 | 4/2006 | Barth et al. | |
| 2006/0126554 A1 | 6/2006 | Motegi et al. | |
| 2006/0165045 A1 | 7/2006 | Kim et al. | |
| 2006/0209870 A1 | 9/2006 | Lee et al. | |
| 2006/0245417 A1 | 11/2006 | Conner et al. | |
| 2007/0047582 A1 | 3/2007 | Malkamaki | |
| 2007/0060139 A1 | 3/2007 | Kim et al. | |
| 2007/0165567 A1 | 7/2007 | Tan et al. | |
| 2007/0177569 A1 | 8/2007 | Lundby | |
| 2007/0206531 A1 | 9/2007 | Pajukoski et al. | |
| 2007/0248075 A1 | 10/2007 | Liu et al. | |
| 2007/0291673 A1 | 12/2007 | Demirhen et al. | |
| 2007/0291719 A1 | 12/2007 | Demirhan et al. | |
| 2007/0291728 A1 | 12/2007 | Dalsgaard et al. | |
| 2007/0291729 A1 | 12/2007 | Dalsgaard et al. | |
| 2008/0056198 A1 | 3/2008 | Charpentier et al. | |
| 2008/0056273 A1* | 3/2008 | Pelletier et al. | 370/395.21 |
| 2008/0101268 A1 | 5/2008 | Sammour et al. | |
| 2008/0167089 A1 | 7/2008 | Suzuki et al. | |
| 2008/0181127 A1 | 7/2008 | Terry et al. | |
| 2008/0273610 A1 | 11/2008 | Malladi et al. | |

FOREIGN PATENT DOCUMENTS

| | | |
|---|---|---|
| EP | 1 168 877 | 1/2002 |
| EP | 1 209 938 | 5/2002 |
| EP | 1 304 898 | 4/2003 |
| EP | 1 315 356 | 5/2003 |
| EP | 1 318 632 | 6/2003 |
| EP | 1337124 A2 | 8/2003 |
| EP | 1 372 310 | 12/2003 |
| EP | 1 420 551 | 5/2004 |
| EP | 1 501 328 | 1/2005 |
| EP | 1 511 245 | 3/2005 |
| EP | 1 720 373 | 11/2006 |
| EP | 1720322 A1 | 11/2006 |
| JP | 2002-539686 | 11/2002 |
| JP | 2003-504935 | 2/2003 |
| JP | 2005-354488 | 12/2005 |
| JP | 2006-505979 | 2/2006 |
| JP | 2006-067115 | 3/2006 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2249917 C2 | 4/2005 |
| WO | WO 00/74416 | 12/2000 |
| WO | WO 2004/043094 | 5/2004 |
| WO | WO 2004/064272 | 7/2004 |
| WO | WO 2005/048613 | 5/2005 |
| WO | WO 2006/075820 A1 | 7/2006 |
| WO | WO 2006/104344 | 10/2006 |
| WO | WO 2006/109851 | 10/2006 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2009/084998 | 7/2009 |

OTHER PUBLICATIONS

LG Electronics Inc: "PDCP retransmissions" 3GPP Draft; R2-073041 PDCP Retransmissions_V2, Aug. 16, 2007, XP050135778.

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

IPWireless, "Layer 2 functions for LTE", 3GPP TSG RAN WG2 #48bis, R2-052377, Oct. 2005.

Samsung, "Selective forwarding/retransmission during HO", 3GPP TSG-RAN2 Meeting #56bis, R2-070130, Jan. 2007.

Samsung, "Re-use of PDCP SN at ARQ level ?", 3GPP TSG-RAN2 Meeting #53bis, R2-061829, Jun. 2006.

Nokia, "Requirements for redirection in E-UTRAN", 3GPP TSG-RAN WG2 Meeting #56bis, R2-070107, Jan. 2007.

Panasonic, "MAC PDU format for LTE", 3GPP TSG RAN WG2#56bis, R2-070096, Jan. 2007.

LG Electronics Inc., "Relative Buffer Status Reporting", 3GPP TSG-RAN WG2 meeting #46bis, R2-050852, Apr. 2005.

NTT DoCoMo et al: "MAC PD U structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XPO11184637 ISSN: 1536-1284.

Alcatel-Lucent: "Downlink Control Signaling and Multiplexing for VOIP, R1-071721", $3^{RD}$ Generation Partnership Project (3GPP) TechnicalSpecification Group (TSG) Radio Access Network (RAN); Workinggroup 1 (WG1), No. 48bis, Mar. 26, 2007, pp. 1-4, XP002460800.

Nokia Corporation, Nokia Siemens Networks: "MAC Header Format, R2-073891", #GPP TSG-RAN WG2 meeting 59bis, Oct. 1, 2007, XP002602993.

LG Electronics Inc.: "Support for VOIP Over MAC-hs/ehs", 3GPP Draft; R2-071542 Support for VOIP Over MAC-HS, $3^{RD}$ Generation Partnership Project (3GPP), Mobile Competence Centre; vol. RAN WG2, No. St. Julian; 20070402, Apr. 2, 2007, XP050134474.

LG Electronics: "UL Timing Control related to Contention Resolution", 3GPP TSG-RAN WG2 #61 bis, Shenzhen, China, Mar. 31-Apr. 4, 2008, R2-081607, XP050139334.

$3^{rd}$ Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

Asustek: "Granularity Consideration for Variable RLC PDUsizes"; R2-070336, XP050133423, Jan. 12, 2007.

3GPP; "Technical Specification Group Radio Access Network"; Medium Access control (MAC) protocol specification (Release 7); XP050367709, Mar. 1, 2007.

Bosch: "Header Compression Signalling" 3GPP Draft; XP050114120, Nov. 29, 1999.

3GPP; "Packet Data Convergence Protocol (PDCP) Specification (Release 7)", 3GPP TS 25.323, XP050367856, Mar. 1, 2007.

* cited by examiner

METHOD OF TRANSMITTING DATA IN A WIRELESS COMMUNICATION SYSTEM

This application claims the benefit of PCT/KR2008/002484 filed on May 1, 2008, along with U.S. Provisional Application Ser. No. 60/915,666 filed May 2, 2007, U.S. Provisional Application No. 60/915,917 filed May 3, 2007, and Korean Patent Application No. 10-2008-0040614 filed on Apr. 30, 2008, all of which are hereby incorporated herein by reference for all purposes in their entireties.

TECHNICAL FIELD

The present invention relates to a wireless communication system, and more particularly, to a method of configuring a data block in a wireless communication system.

BACKGROUND ART

Figure 1:
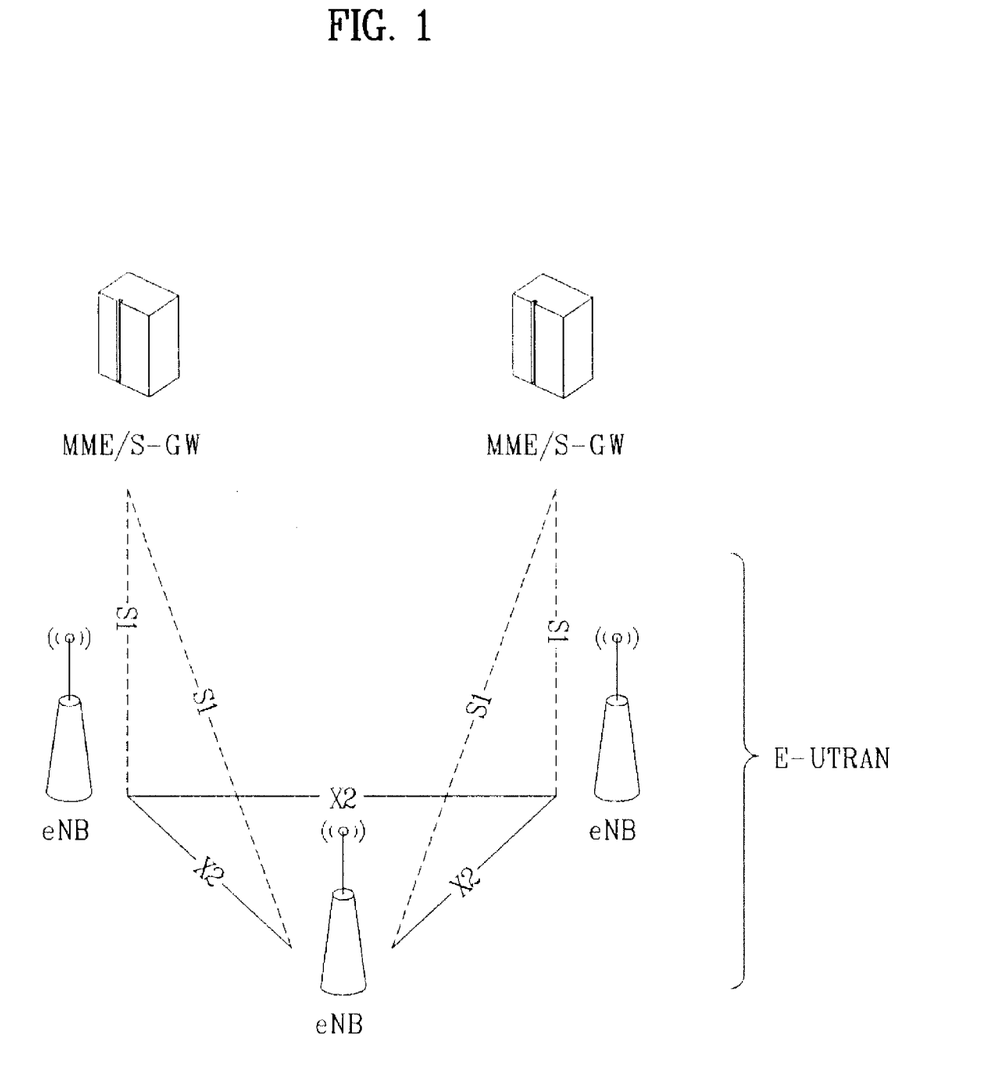
FIG. 1 illustrates a network structure of an E-UMTS (Evolved-Universal Mobile Telecommunications System)

FIG. 1 is a diagram illustrating a network structure of an E-UMTS (Evolved-Universal Mobile Telecommunications System). An E-UMTS is a system evolving from the conventional WCDMA (wideband code division multiple access) UMTS and its basic standardization is currently handled by the 3GPP (3$^{rd}$ Generation Partnership Project). The E-UMTS can also be called an LTE (Long Term Evolution) system.

Referring to FIG. 1, an E-UTRAN (UMTS terrestrial radio access network) includes base stations (hereinafter, referred to as 'eNode B' or 'eNB'), wherein the respective eNBs are connected with each other through X2 interface. Also, each of eNBs is connected with a user equipment (UE) through a radio interface and connected with an EPC (Evolved Packet Core) through S1 interface. The EPC includes MME/SAE gateway (Mobility Management Entity/System Architecture Evolution gateway).

Figure 2:
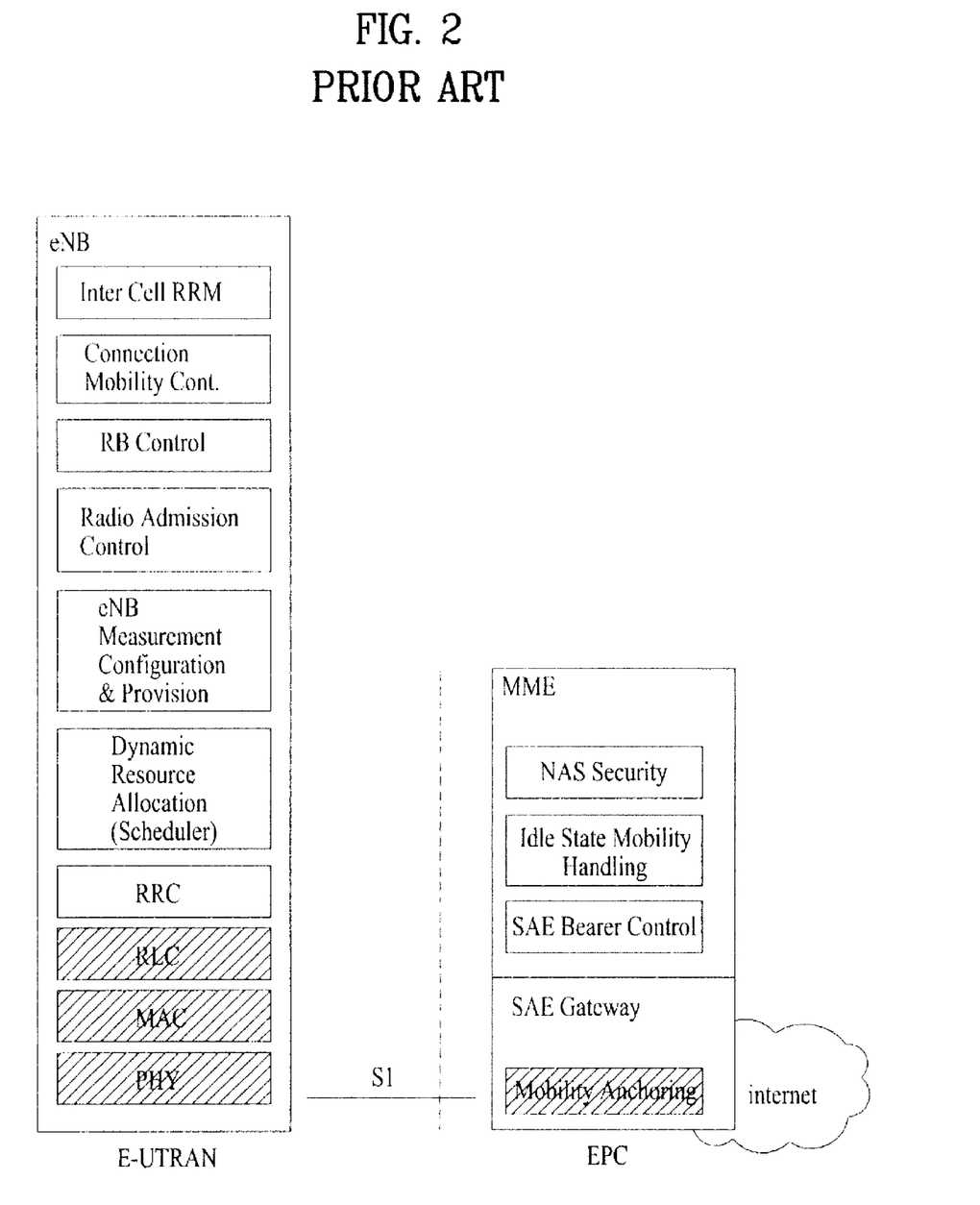
FIG. 2 is a schematic view illustrating an E-UTRAN (UMTS terrestrial radio access network)

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the UE and the network. For this, the RRC layer enables RRC messages to be exchanged between the UE and the network. The RRC layer may distributively be located at network nodes including Node B, an AG and the like, or may independently be located at either the Node B or the AG FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
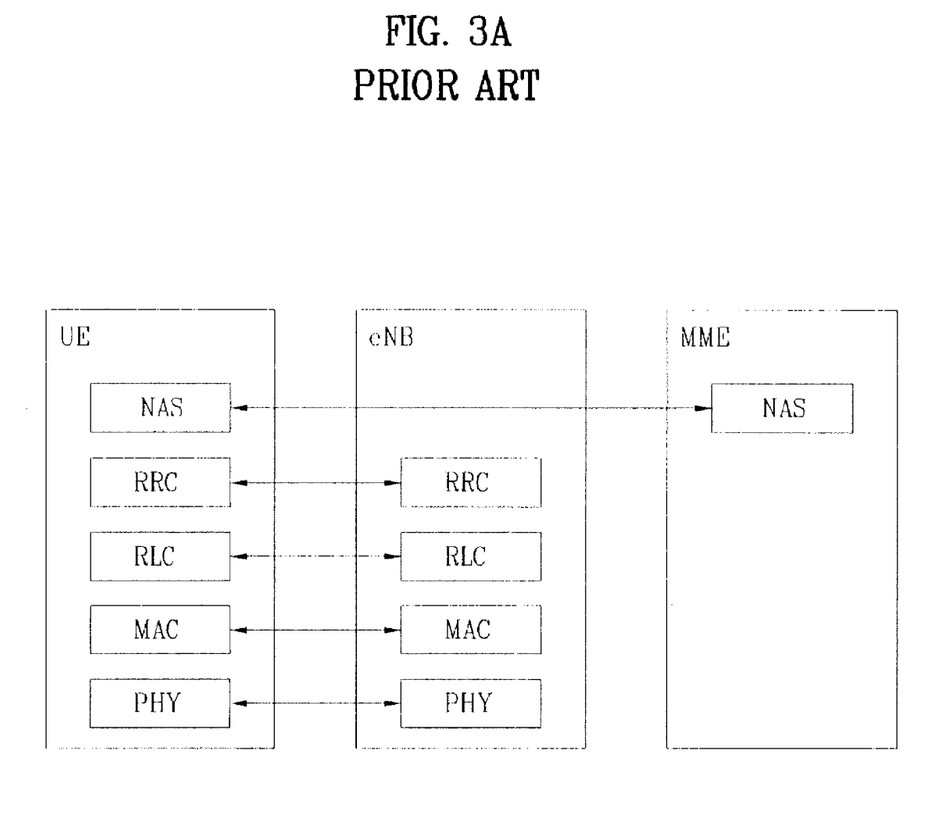
FIG. 3A is a schematic view of a control plane protocol and FIG. 3B is a schematic view of a user plane protocol.
Figure 3B:
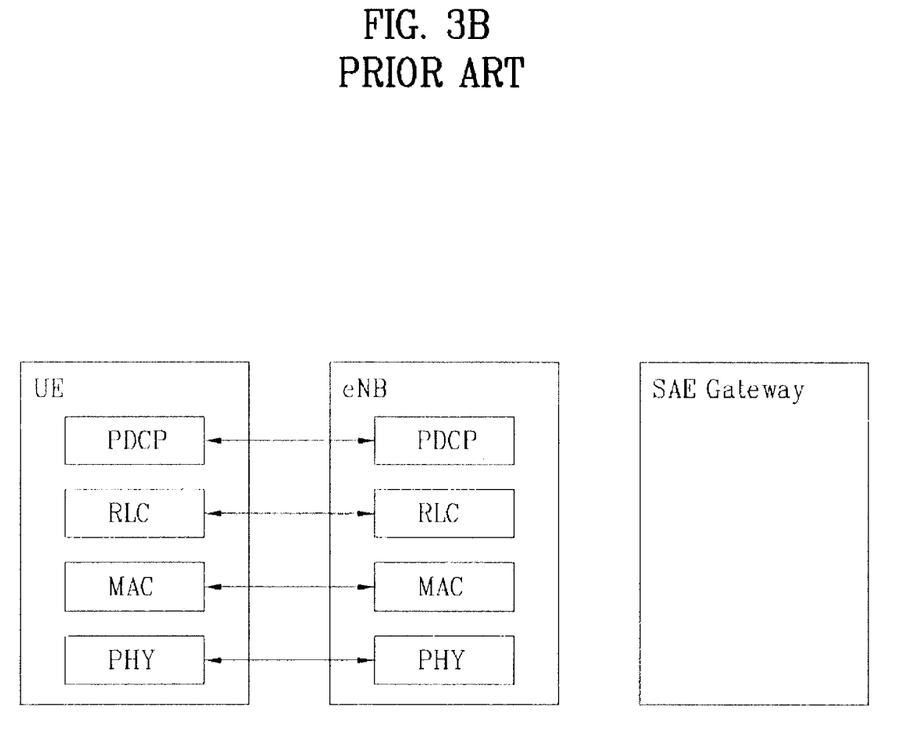

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer is connected to a medium access control (hereinafter, abbreviated as 'MAC') layer above the physical layer via a transport channel. Data are transferred between the medium access control layer and the physical layer via the transport channel. Moreover, data are transferred between different physical layers, and more particularly, between one physical layer of a transmitting side and the other physical layer of a receiving side via the physical channel. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via a logical channel. The RLC layer of the second layer supports reliable data transfer. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

Hereinafter, the PDCP layer included in the second layer will be described.

The PDCP layer is connected with its upper layer, i.e., RRC layer or a user application layer, and is connected with its lower layer, i.e., RLC layer. Main functions carried out by the PDCP layer include a header compression function and a security function. The header compression function is used to enhance use efficiency of radio resources, and is advantageous in that the quantity of information to be transmitted from a radio terminal is decreased using common features of packets transmitted through a single Internet packet stream. Examples of the security function include ciphering and integrity check, and the security function is used to prevent data manipulation or monitoring by the third party from occurring.

Of a header compression scheme used in the PDCP layer, a robust header compression (ROHC) scheme is used to reduce header information of RTP (Real-time Transport Protocol)/UDP (User Datagram Protocol)/IP (Internet Protocol) packets. In addition to the ROCH scheme, another example of the header compression scheme includes RFC2507.

The ROHC scheme is based on the fact that field values of packet headers in continuous packets belonging to one packet stream are almost constant. Accordingly, the ROHC scheme transmits a variable field not all the fields included in the packet headers. For reference, the entire header size of RTP/UDP/IP packets which are not compressed is 40 octet in case of IPv4 (IP version 4) and 60 octet in case of IPv6 (IP version 6) while size of a pure data part called payload is generally 15~20 octet. Accordingly, it is noted that transmission efficiency is very low as control information has a structure greater than that of user data to be actually transmitted. In this respect, if the header compression scheme is used, the quantity of control information can be reduced remarkably. For example, size of the header reduced by the ROHC scheme is only 1 octet to 3 octets.

The ROHC scheme is divided into a uni-directional mode (hereinafter, abbreviated as 'U-mode'), a bi-directional optimistic mode (hereinafter, abbreviated as 'O-mode') and a bi-directional reliable mode (hereinafter, abbreviated as 'R-mode'). In case of the U-mode, the transmitting side performs uni-directional communication to the receiving side. In case of the O-mode or R-mode, the transmitting side performs bi-directional communication to transmit real-time packets and the receiving side transmits transmission status information to the transmitting side. Therefore, according to the ROHC scheme of the O-mode and the R-mode, the transmitting side transmits header compressed packets of data and controls transmission of real-time traffic packets in response to ROHC status information (ACK or NACK) received from the receiving side. A use purpose of the ROHC status information transferred from the receiving side to the transmitting side may depend on the mode. The ROHC scheme of the O-mode increases compression efficiency by mainly transmitting NACK related information, and the ROHC scheme of the R-mode supports robuster header compression scheme by using strict logic based on the ROHC status information. The ROHC status information can be called feedback information in a header compression procedure. In addition to the ROHC scheme, feedback information is also used in another header compression scheme.

Among the modes of the ROCH scheme, the U-mode will be described in detail. A compressor has three statuses, i.e., an entire context forming status, a dynamic context forming status, and an entire context perfect status. A type of a compression header packet is varied depending on each status, and its operation method is also varied depending on each status. First of all, a structure of a context will be described. The structure of a context includes a static context and a dynamic context.

Figure 4:
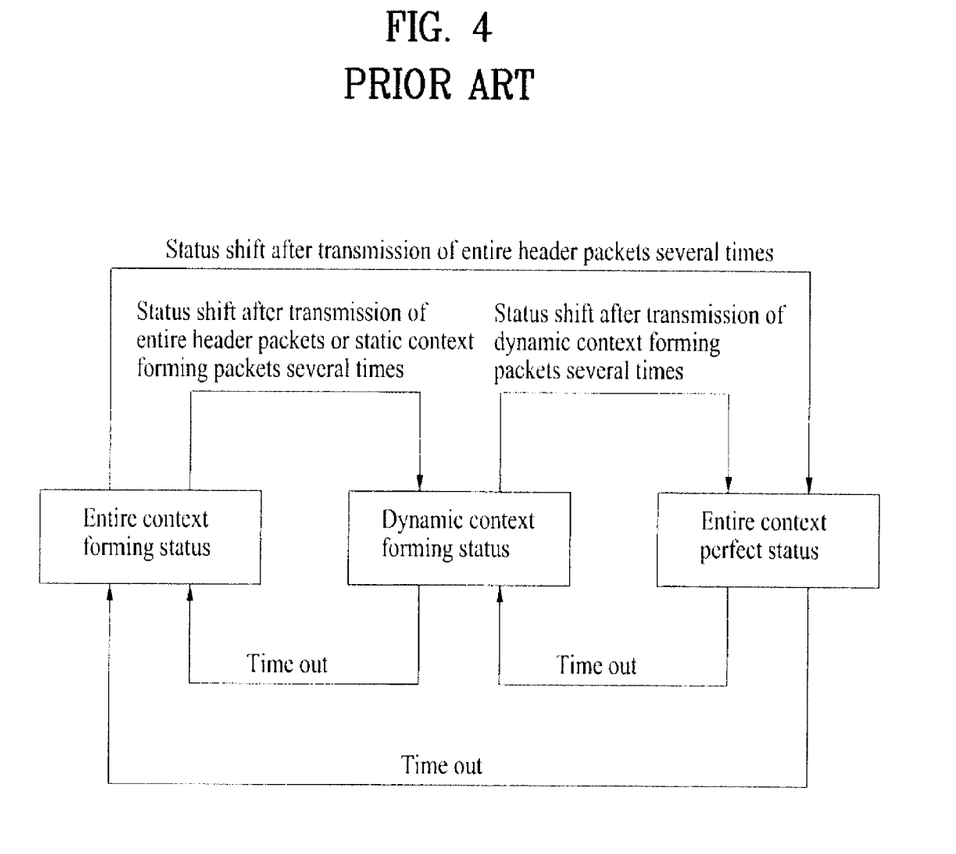
FIG. 4 illustrates a status of an ROHC U-mode compressor according to the related art and its shift procedure.

FIG. 4 illustrates a status of an ROHC U-mode compressor according to the related art and its shift procedure. Referring to FIG. 4, the entire context forming status means that the entire context has not been formed at all, or the entire context should be reconstructed due to its damage. The dynamic context forming status means that a dynamic context part of the entire context should be reconstructed due to its damage. The entire context perfect status means that the entire context is in a perfect status without damage. Each status is shifted to another status per period. At this time, the respective periods are different from one another. For example, a shift period from the entire context perfect status to the dynamic context forming status is much greater than that from the entire context perfect status to the entire context forming status.

DISCLOSURE OF THE INVENTION

A data block generated in the aforementioned PDCP layer according to the related art can be divided into various types depending on whether data included in the data block are transferred from an upper layer or generated directly in the PDCP layer. Also, the data block generated in the PDCP layer can be divided into various types depending on whether data transferred from an upper layer are user data or control data. Meanwhile, since whether to apply a header compression function, whether to apply a ciphering and/or integrity check function, and so on are determined depending a type of each data block generated in the PDCP layer, a method of processing data efficiently by dividing each data block depending on its type is required.

Accordingly, an object of the present invention is to provide a method of processing data efficiently in a wireless communication system, which substantially obviates one or more problems due to limitations and disadvantages of the related art.

To achieve these objects and other advantages and in accordance with the purpose of the invention, as embodied and broadly described herein, a method of generating a data block to be transmitted to a receiving side at a protocol layer performing a header compression function in a wireless communication system comprises generating at least one of a control packet including control information and a compressed packet generated by header compression for an upper layer data block, and generating, in case that the control packet is generated, a first lower layer data block which includes type indication information and the control packet, the type indication information indicating a type of control information included in the generated control packet In another aspect of the present invention, a method of generating a data block to be transmitted from a transmitting side to a receiving side in a wireless communication system comprises generating a control packet at a protocol entity which carries out header compression for an upper layer data block, the control information being associated with a data block received from the receiving side, and generating a first data block which includes a header and the control packet, the header including a type field indicating a type of the control information included in the generated control packet.

BRIEF DESCRIPTION OF THE DRAWINGS

FIG. 3A and FIG. 3B illustrate a structure of a radio interface protocol between a user equipment (UE) and E-UTRAN, in which

BEST MODE FOR CARRYING OUT THE INVENTION

Hereinafter, structures, operations, and other features of the present invention will be understood readily by the preferred embodiments of the present invention, examples of which are illustrated in the accompanying drawings.

Figure 5:
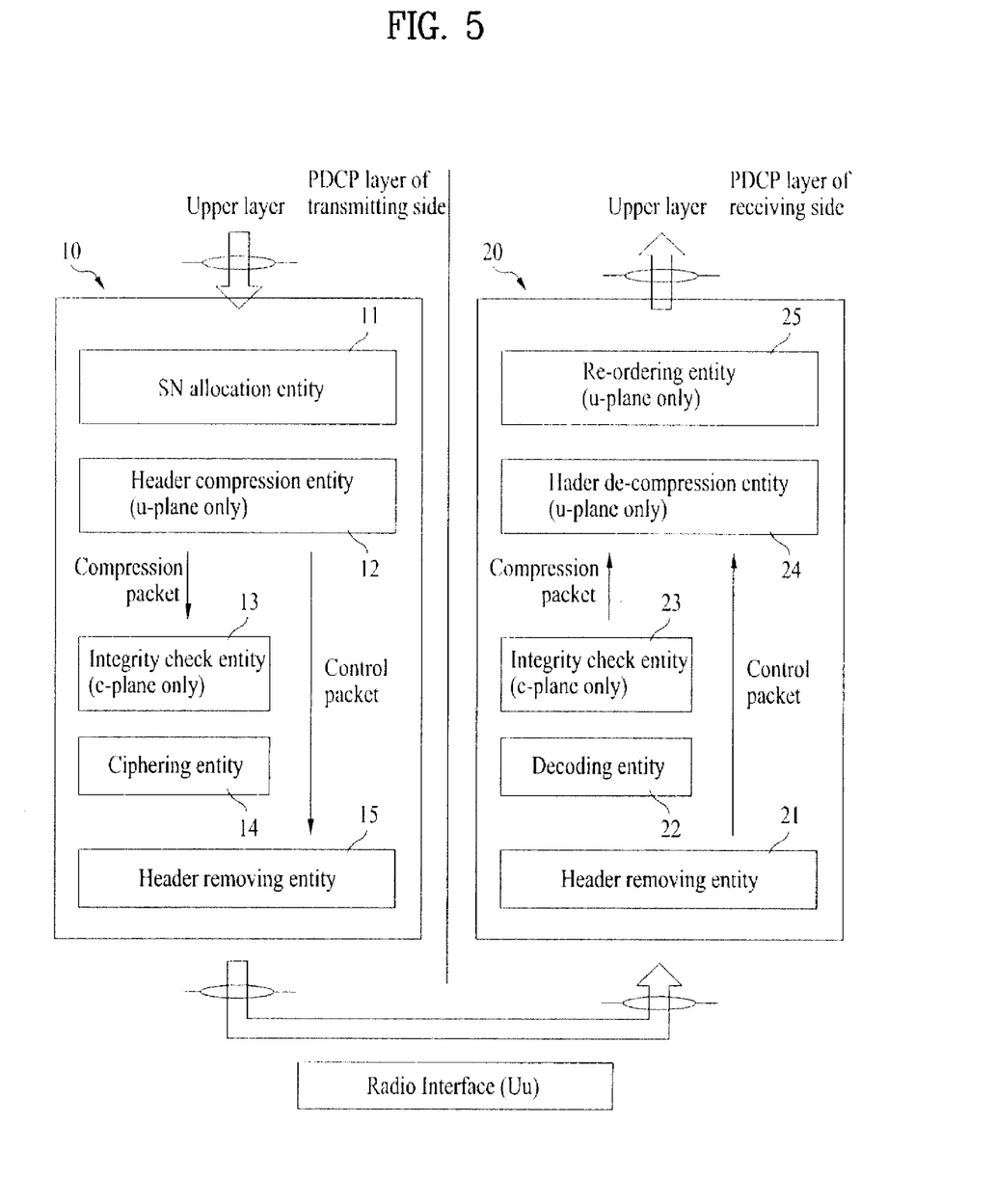
FIG. 5 illustrates functional entities included in PDCP layers of a transmitting side and a receiving side of E-UMTS.

FIG. 5 is a diagram illustrating functional entities included in PDCP layers of a transmitting side and a receiving side of E-UMTS. Although one entity corresponding to each function performed by the PDCP layers is illustrated in FIG. 5, two or more entities may be combined to constitute one entity.

Referring to FIG. 5, the PDCP layer of the transmitting side receives upper layer data, i.e., PDCP SDU (Service Data Unit) from an upper layer such as an RRC layer or an application layer. The upper layer data transferred from the RRC layer is signaling information of a control plane for carrying out a function of the RRC layer, and the upper layer data transferred from the application layer is data of a user plane.

A sequence number (SN) allocation entity 11 allocates a sequence number (SN) to the PDCP SDU transferred from the upper layer. A header compression entity 12 carries out a header compression function for the data of the user plane, i.e., the PDCP SDU, which are transferred from the upper layer. As described above, the header compression entity 12 can use an ROHC scheme as a compression scheme, and configures a header which includes a part not the entire of fields included in a header of a packet based on the fact that values included in corresponding fields of headers of continuous packets belonging to one packet stream are almost constant. However, the header compression entity 12 does not carry out header compression for all PDCP SDUs, and periodically transmits a full header to the receiving side, wherein the full header is not compressed. The receiving side reconstructs compressed headers based on the received full header. The header compression function is not applied to the upper layer data transferred from the RRC layer.

Meanwhile, the header compression entity 12 generates a control packet which has no relation with the PDCP SDU transferred from the upper layer, i.e., which does not include upper layer data. The control packet is related to carrying out the function of the PDCP layer, and includes control information generated by the header compression entity. An example of the control information includes feedback information or status information for at least one PDCP PDU received from the receiving side. The feedback information includes information associated with header compression of a PDCP PDU received from the receiving side. The status information can include information as to whether the PDCP PDU received from the receiving side has been successfully received or whether retransmission is required. The control information can include other control information in addition to the feedback information or the status information.

Figure 6:
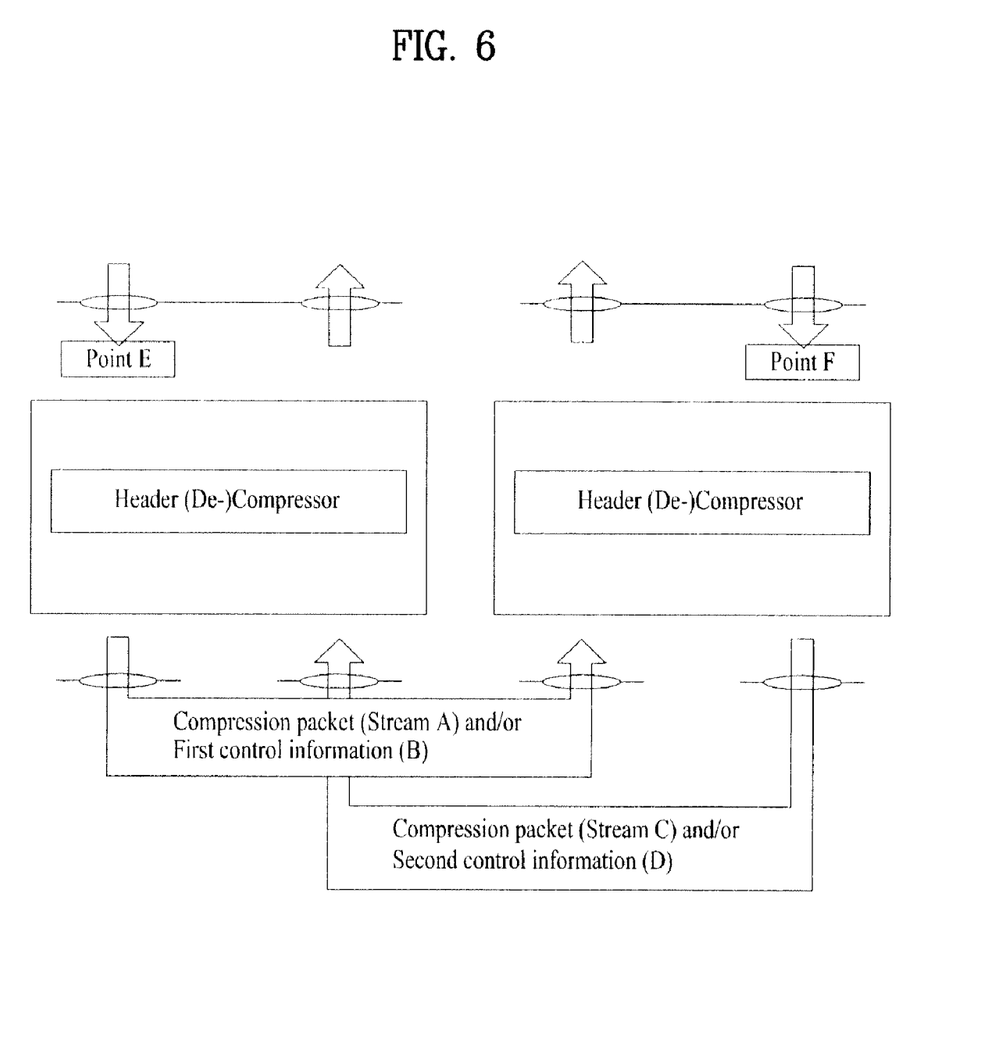
FIG. 6 illustrates a procedure of transferring control information generated in a header compression entity of FIG. 5 to a receiving side.

FIG. 6 is a diagram illustrating a procedure of transferring control information generated in the header compression entity 12 to the receiving side.

Referring to FIG. 6, first control information B is transmitted from the left to the right, and means response information of compressed packet streams, i.e., 'Stream C,' which are transmitted from the right to the left, such as feedback information or status information. Second control information D is transmitted from the right to the left, and means response information of compressed packet streams, i.e., 'Stream A,' which are transmitted from the left to the right. In other words, although 'Stream A' is a stream of packets of PDCP SDUs which are transferred through 'Point E' and then compressed, the first control information B transferred in the same direction has no relation with the PDCP SDUs transferred through 'Point E' and is related with a stream of packets transferred to the PDCP layer through 'Point F' and connected to 'Stream C.' In other words, the first control information and the second control information are related with management of context information. Accordingly, the control information is information generated regardless of PDCP SDUs transferred from the upper layer in view of the PDCP layer of the transmitting side. In this case, a sequence number is not allocated by the SN allocation entity 11.

Referring to FIG. 5 again, an integrity check entity 13 carries out integrity protection for the PDCP SDUs, which include control plane data, i.e., the PDCP SDUs transferred from the RRC layer. The integrity check can be carried out in such a manner that a field called MAC-I (Message Authentication Code for Integrity Protection) is affixed to a PDCP PDU to be transmitted.

A ciphering entity 14 performs ciphering on a compressed packet and an RRC message, wherein the compressed packet has undergone header compression by the header compression entity 12 and the RRC message has undergone integrity protection by the integrity check entity 13. Data (PLAINTEXT BLOCK) is ciphered through bit operation between ciphering parameters and MASK generated by a specific ciphering algorithm to form CIPHERTEXT BLOCK. The CIPHERTEXT BLOCK is transmitted to the receiving side through a radio interface, and the receiving side which has received the CIPHERTEXT BLOCK generates the same MASK through the ciphering algorithm used at the transmitting side to recover the original PLAINTEXT BLOCK. In addition to f8 algorithm used in 3GPP, various algorithms according to the related art can be used as the ciphering algorithm. The ciphering parameters mean CK, COUNT-C, BEARER, DIRECTION, LENGTH, etc, wherein COUNT-C is related with the sequence number of the PDCP SDU where ciphering is carried out, and is varied depending on time. In FIG. 5, a control packet to which the sequence number is not allocated are not ciphered.

A header addition entity 15 generates PDCP PDU by adding a PDCP header to the data block transferred from the header compression entity 12 or the ciphering entity 14. The PDCP PDU can be divided into three types. The first type is a PDCP PDU which includes upper layer data of the control plane, wherein the upper layer data is transferred from the RRC layer. The second type is a PDCP PDU which includes upper layer data of the user plane, wherein the upper layer data is transferred from the application layer which is the upper layer. The third type is a PDCP PDU which includes a control packet generated by the header compression entity 12. A PDCP PDU corresponding to each type includes a different header each other in accordance with the embodiment of the present invention. As illustrated in FIG. 5, since ciphering is carried out by the ciphering entity 14 before header addition, ciphering is not carried out for the header of the PDCP PDU regardless of the type of PDCP PDU.

Figure 7:
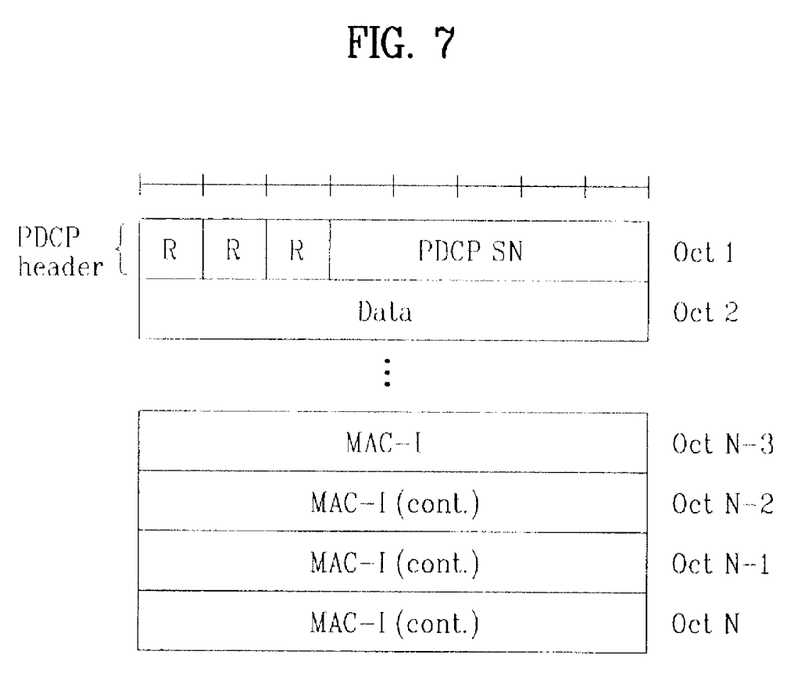
FIG. 7 illustrates an example of a data format of PDCP PDU which includes upper layer data of a control plane.

FIG. 7 is a diagram illustrating an example of a data format of the PDCP PDU which includes the upper layer data of the control plane. As described above, after the sequence number is allocated by the SN allocation entity 11 of FIG. 5 to the upper layer data of the control plane, i.e., the control information transferred from the RRC layer, integrity check is carried out for the control information by the integrity check entity 13. Accordingly, the header of the PDCP PDU illustrated in FIG. 7 includes a PDCP SN field which includes a sequence number. An 'R' field means a reserved bit. A MAC-I field includes a message authentication code added for integrity protection by the integrity check entity 13.

Figure 8:
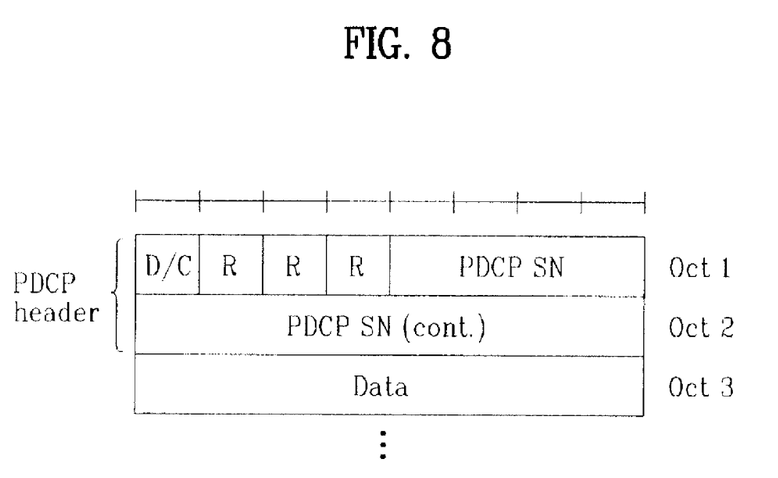
FIG. 8 illustrates an example of a data format of PDCP PDU which includes upper layer data of a user plane.

FIG. 8 is a diagram illustrating an example of a data format of the PDCP PDU which includes the upper layer data of the user plane. The header of the PDCP PDU illustrated in FIG. 8 includes a D/C field and a PDCP SN field. The D/C field includes information indicating whether a corresponding PDCP PDU includes user data or control information. In FIG. 8, the D/C field includes an indicator which indicates that a corresponding PDCP PDU includes user data.

Figure 9A:
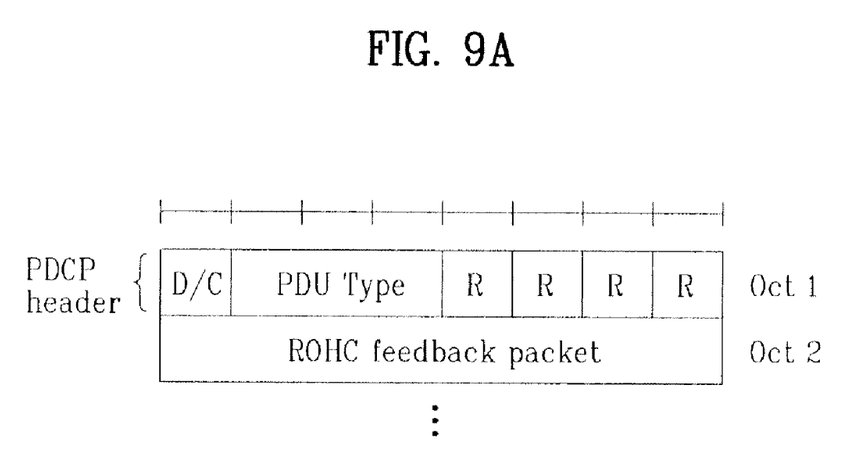
FIG. 9A and FIG. 9B illustrate examples of data formats of PDCP PDUs which include control information generated in a PDCP layer not an upper layer.
Figure 9B:
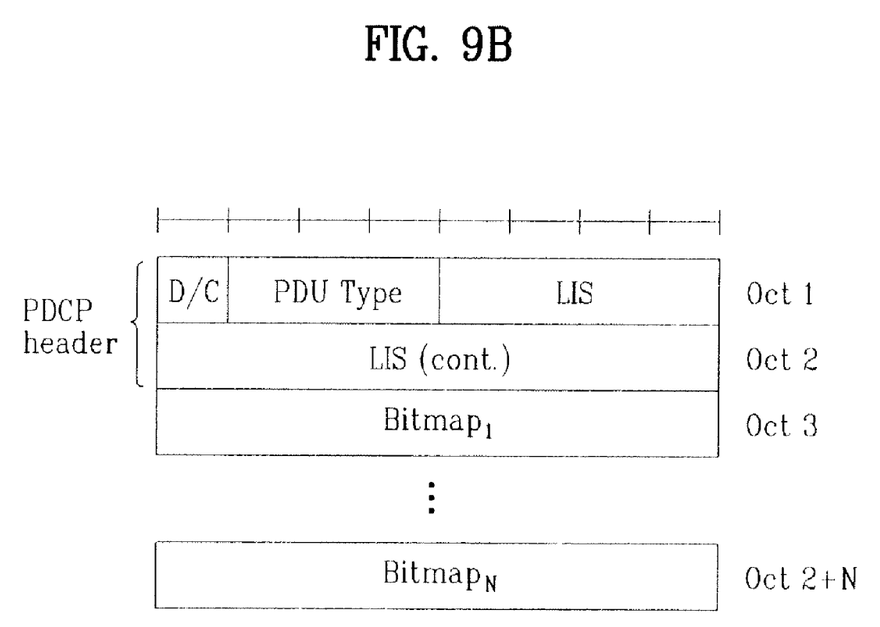

FIG. 9A and FIG. 9B are diagrams illustrating examples of data formats of PDCP PDUs which include control information generated in the PDCP layer not an upper layer, wherein the PDCP PDUs include different types of control information. The PDCP PDUs illustrated in FIG. 9A and FIG. 9B include a D/C field and a PDU type field in common. The D/C field includes an indicator which indicates that a corresponding PDCP PDU includes control information. The PDU type field includes information indicating a type of control information included in the corresponding PDCP PDU. Since FIG. 9A and FIG. 9B include different types of control information, the respective PDU Type fields include different types of information. Accordingly, the receiving side can identify what type of control information is included in the corresponding PDCP PDU, by using the information included in the PDU Type field.

The control information included in the PDCP PDU of FIG. 9A includes an interspersed ROHC feedback packet. The interspersed ROHC feedback packet is generated by the header compression entity 12 of FIG. 5, have no relation with the PDCP SDU transferred from the upper layer, and include feedback information of the PDCP PDU transmitted from the receiving side. The information included in the PDCP PDU of FIG. 9B is status report information, and includes information indicating whether a plurality of PDCP PDUs transmitted from the receiving side have been successfully received. For example, the status report information can include information as to whether the plurality of PDCP PDUs transmitted from the receiving side have been successfully received, in a bit map type. In addition to the control information included in the PDCP PDUs illustrated in FIG. 9A and FIG. 9B, if there exists another type of control information generated in the PDCP PDU layer, PDCP PDU which includes such another type of control information can be configured. The PDU Type field included in the header of the corresponding PDCP PDU includes information different from the PDU Type field included in the PDCP PDUs of FIG. 9A and FIG. 9B, so that the PDU Type fields can be identified from each other. An example of another type of control information generated in the PDCP layer includes status report information for reporting reception acknowledgement information of PDCP SDUs after carrying out handover.

Referring to FIG. 5 again, a procedure in the PDCP layer of the receiving side for receiving a PDCP PDU from the transmitting side, carrying out data processing for the received PDCP PDU in accordance with the PDCP protocol, and transferring the data-processed PDCP PDU to the upper layer is carried out in an inverse order of the procedure in the PDCP layer of the transmitting side. At this time, the PDCP layer of the receiving side identifies a type of the PDCP PDU or a type of control information included in the PDCP PDU with reference to information included in the header of the received PDCP PDU, i.e., D/C field, PDU Type field, PDCP SN field, etc., and is operated in accordance with the identified result.

In FIG. 5, a header removing entity 21 removes the header from the received PDCP PDU. A decoding entity 22 carries out decoding for the PDCP PDU from which the header has been removed. If the decoded PDCP PDU includes data of the control plane, an integrity check entity 23 carries out integrity check for the decoded PDCP PDU. If the decoded PDCP PDU includes data of the user plane, a header de-compression entity 24 carries out header de-compression for the decoded PDCP PDU. A re-ordering entity 25 carries out a re-ordering procedure of the PDCP SDUs generated as above and then transfers the PDCP SDUs to the upper layer. If the PDCP PDU received from the transmitting side is identical with the PDCP PDU illustrated in FIG. 9A or FIG. 9B, the PDCP PDU of which the header has been removed by the header removing entity 21 is transferred to the header de-compression entity 24 without integrity check or header de-compression.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system such as a mobile communication system and a wireless Internet system.

The invention claimed is:

1. A method of generating a data block to be transmitted to a receiving side at a protocol layer performing a header compression function in a wireless communication system, the method comprising:
   generating at least one of a compressed packet by performing the header compression function for an upper layer data block received from an upper layer and a control packet having no relation with the upper layer data block; and
   if the compressed packet is generated, generating a first lower layer data block which includes the compressed packet, and generating a second lower layer data block which includes the control packet, wherein each of the first lower layer data block and the second lower layer data block includes an indicator indicating whether the corresponding lower layer data block includes the compressed packet or the control packet, and wherein the second lower data block further includes type indication information indicating whether the control packet includes header compression feedback information, and wherein the first lower layer data block is generated by ciphering the compressed packet and adding the indicator to the ciphered compressed packet whereas the second lower data block is generated by adding the indicator and the type indication information to the control packet without ciphering the control packet.

2. The method of claim 1, wherein generating at least one of the control packet and the compressed packet is carried out by an entity which performs the header compression function.

3. The method of claim 1, wherein the indicator is included in a header of the first lower layer data block, and the type indication information and the indicator are included in a header of the second lower layer data block.

4. The method of claim 1, wherein the second lower layer data block includes a sequence number while the first lower layer data block does not include a sequence number.

5. The method of claim 1, wherein the type indication information indicates whether the control packet includes status information for at least one data block received from the receiving side.

6. A method of receiving a data block transmitted by a transmitting side at a protocol layer performing a header compression function, the method comprising:
   determining, based on an indicator included in the data block, whether the data block includes a compressed packet generated by performing the header compression function for an upper layer data block at a protocol layer of the transmitting side or a control packet having no relation with the upper layer data block;
   if the indicator indicates that the data block includes the control packet, determining, based on type indication information included in the data block, whether the control packet includes header compression feedback information, wherein:
   if the data block includes the compressed packet, the method further comprises:
   de-ciphering the compressed packet;
   performing header de-compression on the de-ciphered compressed packet; and
   transferring the de-compressed packet to an upper layer of a receiving side, and if the data block includes the control packet, the method further comprises:
   transferring the control packet to the upper layer of the receiving side without de-ciphering or without de-compressing the control packet.

7. The method of claim 6, wherein if the data block includes the compressed packet, the data block does not include the type indication information.

8. The method of claim 7, wherein the indicator and the type indication are included in a header of the data block.

9. The method of claim 8, further comprising:
   removing the header from the data block.

10. The method of claim 6, wherein the data block includes a sequence number if the data block includes the compressed packet, while the data block does not include a sequence number if the data block includes the control packet.

11. The method of claim 6, wherein whether the control packet includes status information for at least one data block received from receiving side is further determined at the protocol layer of the receiving side based on the type indication information.

12. The method of claim 1, wherein the header compression feedback information is associated with header compression of a data block received from the receiving side.

13. The method of claim 6, wherein the header compression feedback information is associated with header compression of a data block transmitted from the receiving side to the transmitting side.

* * * * *

UNITED STATES PATENT AND TRADEMARK OFFICE
CERTIFICATE OF CORRECTION

PATENT NO. : 7,965,740 B2
APPLICATION NO. : 12/451219
DATED : June 21, 2011
INVENTOR(S) : Sung Duck Chun et al.

It is certified that error appears in the above-identified patent and that said Letters Patent is hereby corrected as shown below:

In claim 1, at column 9, line 4, change "lower data block" to --lower layer data block--.

In claim 1, at column 9, line 10, change "lower data block" to --lower layer data block--.

In claim 11, at column 10, line 28, change "received from receiving side" to --received from the receiving side--.

Signed and Sealed this
Sixteenth Day of August, 2011

David J. Kappos
*Director of the United States Patent and Trademark Office*